United States Patent [19]
Lavey, Jr. et al.

[11] Patent Number: 6,023,698
[45] Date of Patent: *Feb. 8, 2000

[54] SYSTEM AND METHOD FOR TRANSPARENTLY REGISTERING AND UPDATING INFORMATION OVER THE INTERNET

[75] Inventors: Anthony M. Lavey, Jr., Marietta; Rex Lavon Loftin, Smyrna; Sean T. Murray, Marietta; John M. Pisello, Rutledge, all of Ga.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,580

[22] Filed: Dec. 5, 1996

[51] Int. Cl.⁷ ..................................................... G06F 17/30
[52] U.S. Cl. ............................... 707/10; 709/203; 380/49
[58] Field of Search ........................ 707/10, 104; 379/93, 379/12; 364/514 A; 395/200.12; 370/104; 380/49, 24; 709/203

[56] References Cited

U.S. PATENT DOCUMENTS

| | | | |
|---|---|---|---|
| 5,675,510 | 10/1997 | Coffey et al. | 364/514 A |
| 5,682,478 | 10/1997 | Watson et al. | 395/200.12 |
| 5,706,437 | 1/1998 | Kirchner et al. | 395/200.12 |
| 5,708,780 | 1/1998 | Levergood et al. | 395/200.12 |
| 5,710,918 | 1/1998 | Lagarde et al. | 707/10 |
| 5,715,453 | 2/1998 | Stewart | 707/104 |
| 5,721,908 | 2/1998 | Lagarde et al. | 707/10 |
| 5,724,355 | 3/1998 | Bruno et al. | 370/401 |
| 5,729,594 | 3/1998 | Klingman | 379/93.12 |
| 5,740,252 | 4/1998 | Minor et al. | 380/49 |
| 5,778,178 | 7/1998 | Arunachalam | 395/200.33 |
| 5,812,668 | 9/1998 | Weber et al. | 380/24 |
| 5,825,890 | 10/1998 | Elgamal et al. | 380/49 |

FOREIGN PATENT DOCUMENTS

| | | | |
|---|---|---|---|
| 0774722A2 | 5/1997 | European Pat. Off. | 17/30 |
| 229036 | 3/1996 | United Kingdom | G06T 11/60 |

OTHER PUBLICATIONS

"Take An Internet Tour Without Speaking The Language: IPX–To–IP Gateways", Network Computing, p. 121, Sep. 15, 1996.

Gee et al. "Novel Approaches to Automating the Gathering of Intelligence from the Onlin Community Through the Internet", Online Information 94 Proceedings, p501–11.

"Delrina Intros CommSuite for Networks", Newsbytes News Network, Apr. 1995.

(List continued on next page.)

*Primary Examiner*—Thomas G. Black
*Assistant Examiner*—Charles L. Rones

[57] ABSTRACT

A system and method for retrieving information from an online database. The system includes a server computer that is connected to a computer network, such as the Internet or an IP-based computer network. The server computer includes a server memory that stores token handler instructions, and a server processor that is responsive to the token handler instructions. A client computer includes a client memory that stores client application instructions and a client processor connected to the client processor. The client application instructions include a set of dynamic link libraries of code and information for each of a plurality of Internet service providers. The client processor is responsive to the client application instructions by establishing a connection with the server computer over the Internet through a selected Internet service provider and by sending tokens to the server computer. The connection to the Internet through the selected Internet service provider is based on a set of dynamic link libraries of code and information for the selected Internet service provider.

43 Claims, 12 Drawing Sheets

OTHER PUBLICATIONS

"Pepsi, Wrigley Target Russia It & 2 of its Bottlers Will Make $550–Mil Investment to Build MFG Plants Over 5 Years in Russia", Chicago Sun Times, p.41, Apr. 1996.

"Ease of Construction", InformationWeek, p. 01A, Apr. 1996.

"Special Report: Bay Networks' Instant Internet", PCNetter, v.11, n.12, Dec. 1996.

"Delrina Announces Commsuite for Networks Enables Enterprise Workgroups", M2 Presswire, May 1995.

"Delrina Announces Commsuite for Networks", M2 Presswire, Oct. 1995.

"Delrina Delivers Internet Messaging in New WinComm Pro", M2 Presswire, Jan. 1995.

"Web–To–Database Communications with API–Based Connectivity Software", Network Computing, p. 134, Nov. 1996.

SYSTEM AND METHOD FOR TRANSPARENTLY REGISTERING AND UPDATING INFORMATION OVER THE INTERNET

BACKGROUND OF THE INVENTION

1. Field of the Invention

The present invention relates to the field of computing. More particularly, the present invention relates to a system and a method for accessing and downloading information from an online database.

2. Description of the Related Art

With the multitude of Internet service providers (ISPs) available to a user, it is difficult to create an Internet hybrid application (a client/server application that accesses information located on the Internet, or an IP-based computer network) that allows convenient and transparent access to data that is located at an Internet web site through any one of the multitude of ISPs so that data used by the application can be updated or augmented. Previously, this difficulty has been overcome by one of two approaches. First, update data for an application has been hosted at a selected service provider site and has been offered to subscribers of that particular Internet service. The hybrid application using the update data is then designed to interface with only that specific service provider. This approach has the drawback that users of the application are forced to be subscribers of the specific Internet service, thus limiting the number of users for which the application is suitable. The other approach has been to allow an application user to manually retrieve update data off the Internet. This approach has serious drawbacks because there are a number of ways errors can be made when the update data is downloaded, including downloading the data into an incorrect directory and downloading undesired data.

Creating Internet hybrid applications that access the Internet, or any other IP-based computer network, can also be a complex task for an application developer. Since Internet service providers each have a proprietary way of interfacing with their software, there is no standard interface available to deal with multiple Internet service providers. Specific steps are required for connecting to the Internet, disconnecting from the Internet, verifying online status, downloading files, etc.

What is needed is a client/server application interface that allows application programmers to easily create Internet hybrid applications that allow users to use their preferred Internet service provider with a standard application programmer's interface (API) for obtaining a convenient seamless connection to the Internet for communicating with an online site, such as for registering with the online server site and receiving data for augmenting static information provided with the media of the client application with online resources.

SUMMARY OF THE INVENTION

The present invention provides a client/server application an interface that allows programmers to easily create applications that allow users to use their preferred Internet service provider for obtaining a convenient seamless connection to the Internet for communication with an online site. The access methods provided to the application programmer are consistent for each supported Internet service provider, and allow for immediate expansion to include new service providers at any time. The present invention also provides a transparent information exchange processes to handle the exchange of data, such as registration, identification, or any other desired information, with the online server site, in addition to transparently receiving data from the online server site for augmenting static information provided with the media of the client application. In this regard, the present invention includes a server computer connected to an IP-based computer network, such as the Internet. The server computer includes a server memory that stores token handler instructions, and a server processor that is connected to the server memory and is responsive to the token handler instructions. A client computer that communicates with the server computer includes a client memory and a client processor. The client memory, which can include a storage device and/or CD-ROM, stores client application instructions that include a set of dynamic link libraries of code and information for each of a plurality of Internet service providers. The client processor is connected to the client memory and is responsive to the client application instructions by establishing a connection with the server computer over the Internet through a selected Internet service provider and sending the token to the server computer. According to the invention, the connection to the Internet through the selected Internet service provider is based on a set of dynamic link libraries of code and information for the selected Internet service provider. The dynamic link libraries contain a detailed set of commands and information designed to allow applications to be created and maintained across a multitude of Internet service providers. The design of the dynamic link libraries allow for expansion to support new service providers by simply adding additional support dynamic link libraries for any Internet service provider.

The present invention also provides a method for accessing online information. According to the invention, token handler instructions are stored in a server memory of a server computer connected to the Internet, while client application instructions used to create, transmit, and receive tokens are stored in a client memory at a client computer. The client application instructions include a set of dynamic link libraries of code and information for each of a plurality of Internet service providers. An Internet service provider is selected from the plurality of Internet service providers and a connection with the server computer is established over the Internet through the selected Internet service provider. The connection through the selected Internet service provider is based on a set of dynamic link libraries of code and information for the selected Internet service provider. A token is sent to the server computer over the Internet and received at the server computer. The server computer then processes the token based on the token handler instructions stored in the server memory.

The token sent to the server computer contains data relating to user registration information, user identification information, object request information, and/or actions to be executed by the server. The server computer responds to user registration information by entering the user registration information into a user database. When the token contains user identification information, the server processor validates the user identification information, and when the token contains object request information, the server processor accesses a database for the object and sends the object to the client computer. Preferably, the client computer graphically displays the status of the object requested while the object is being sent from the host computer to the client computer.

According to the invention, a native format token of the client application is converted into a URL-encoded format token and the URL-encoded format token is preferably converted into a request in hypertext transfer protocol (HTTP) that is sent to the server computer. Alternatively, the URL-encoded format token can be converted into a request that is formatted in another protocol such as File Transfer Protocol (FTP), Mail, Telnet, Gopher, Network News Transport Protocol (NNTP), Chat, and Forums.

BRIEF DESCRIPTION OF THE DRAWING

The present invention is illustrated by way of example and not limitation in the accompanying figures in which like reference numerals indicate similar elements and in which.

DETAILED DESCRIPTION OF THE INVENTION

To facilitate a common interface for allowing a client/server application access to information on the Internet, regardless of the Internet service provider (ISP) used, the present invention provides an interface permitting Transparent Registration, Update and Exchange of data features using the Internet Protocol (TRUE/IP). That is, the present invention provides a standard interface for a client/server application, such as a CD-ROM/Internet hybrid application, for connecting to an online server site for augmenting static client application material with dynamic online information contained at the online server site. The transparent interface protocol of the present invention permits convenient interaction with an online server site, such as for receiving requested information, receiving any new information necessary for operation of the application, for logging any information transfer, and for closing the connection when desired.

The Internet service providers for which the present invention is compatible have the ability to launch their ISP access software with minimal user interaction, such as a password being entered once or once per session, to operate with a browser that can be opened to a specific uniform resource locator (URL), and/or to operate with any tunneling application or protocol for allowing access to a web site via a URL and for downloading files in response to client application requests. Examples of currently available Internet service providers providing these abilities are the IBM™ Global Network, America Online™, CompuServe™ and direct Internet connections. A generic Internet dialer can also be used for supporting unlisted ISPs, but this type of ISP forces a user to manually establish a connection with the ISP.

Figure 1:
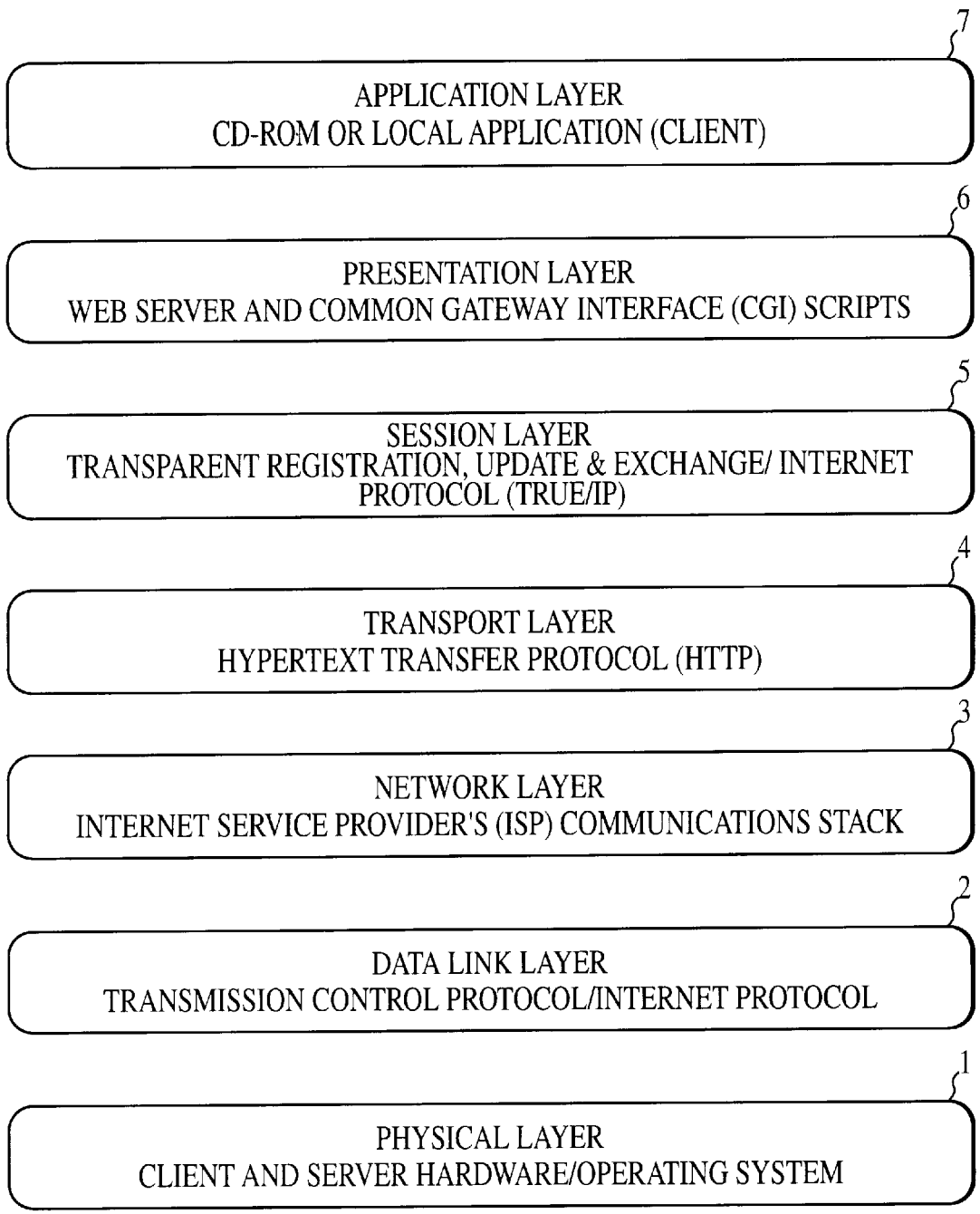
FIG. 1 shows an Open System Interconnection (OSI) architectural hierarchy diagram of a client/server application incorporating the present invention.

A standard architecture for any computer-to-computer communication is illustrated by the Open System Interconnection (OSI) model that has been standardized by the International Standardization Organization (ISO). FIG. 1 shows an OSI architectural hierarchy of layers mapped onto corresponding functional implementations of a client/server application incorporating the present invention.

Layer 1 of the OSI hierarchy is the physical layer. In relationship to a user, this layer corresponds to client and server hardware, and an operating system, and relates to electrical, mechanical and functional controls of data circuits. Layer 2 of the OSI model, the data link layer, deals with procedures and protocols for operating communication lines, and detecting and correcting message errors. For the present invention, this layer preferably conforms to the Transmission Control Protocol/Internet Protocol (TCP/IP). Layer 3, the network layer, corresponds to a communication stack of an Internet service provider for the present invention. In relationship to a user, this particular layer is concerned with how data is transferred between computers and deals with routing within and between individual networks.

Layer 4, the OSI transport layer, is concerned with definition of rules for information exchange and management of end-to-end delivery of information within and between networks, including error recovery and flow control. For the present invention, this layer of the model preferably conforms to the Hypertext Transfer Protocol (HTTP). The TRUE/IP protocol of the present invention also supports any other IP-based protocol, such as File Transfer Protocol (FTP), Mail, Telnet, Gopher, Network News Transport Protocol (NNTP), Chat, Forums, etc. Layer 5, the session layer, handles dialog management and controls use of the basic communications provided by the transport layer. Layer 5 is the layer in which the present invention is preferably implemented by providing a code layer between an application and the code running an Internet service provider network.

Layer 6 is the presentation layer of the OSI model and is concerned with masking differences between varying data formats, such as character codes, for providing transparent communications. For the present invention, this layer preferably uses a web server and common gateway interface (CGI) scripts. Layer 7 is the application layer, and corresponds to an application incorporating the present invention, such as a CD-ROM application.

Figure 2A:
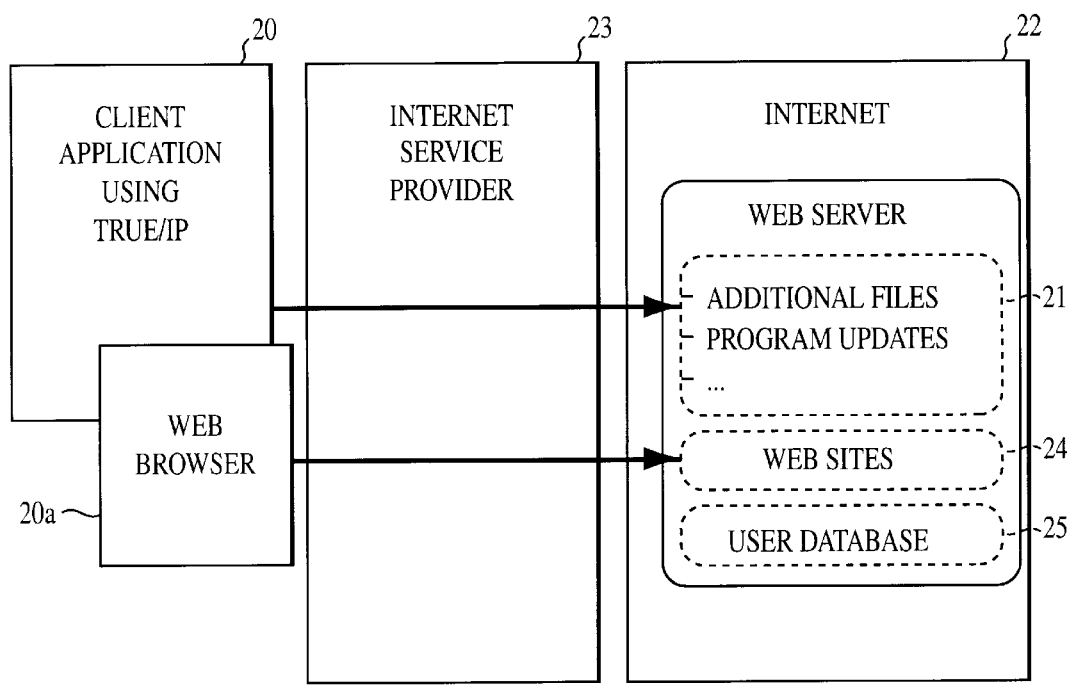
FIG. 2A shows a diagram of the relationship between a client/server application incorporating the present invention and online server resources connected to the Internet.

FIG. 2A is a diagram showing the relationship between a client/server application incorporating the present invention and online server resources connected to the Internet. In FIG. 2A, a client/server application 20 accesses an online server site using TRUE/IP with or without a browser 20a, containing information, such as any of types 21, 24 or 25, over the Internet 22 through an Internet service provider (ISP) 23. The Internet service provider can be any one of a plurality of Internet service providers. Client/server application 20 can be embodied as a client/server CD-ROM/ Internet hybrid application, for example. Information types 21, 24 and 25 available on the online server each are accessible over the Internet and can include a host computer running a Hypertext Transfer Protocol (HTTP) server, such as an IBM™ Internet Connection Server. The host computer site runs processes that provide, for example, security and user validation, access to online files, databases and/or other information sources, and the ability to upgrade and expand client application 20 without distributing new software.

Figure 2B:
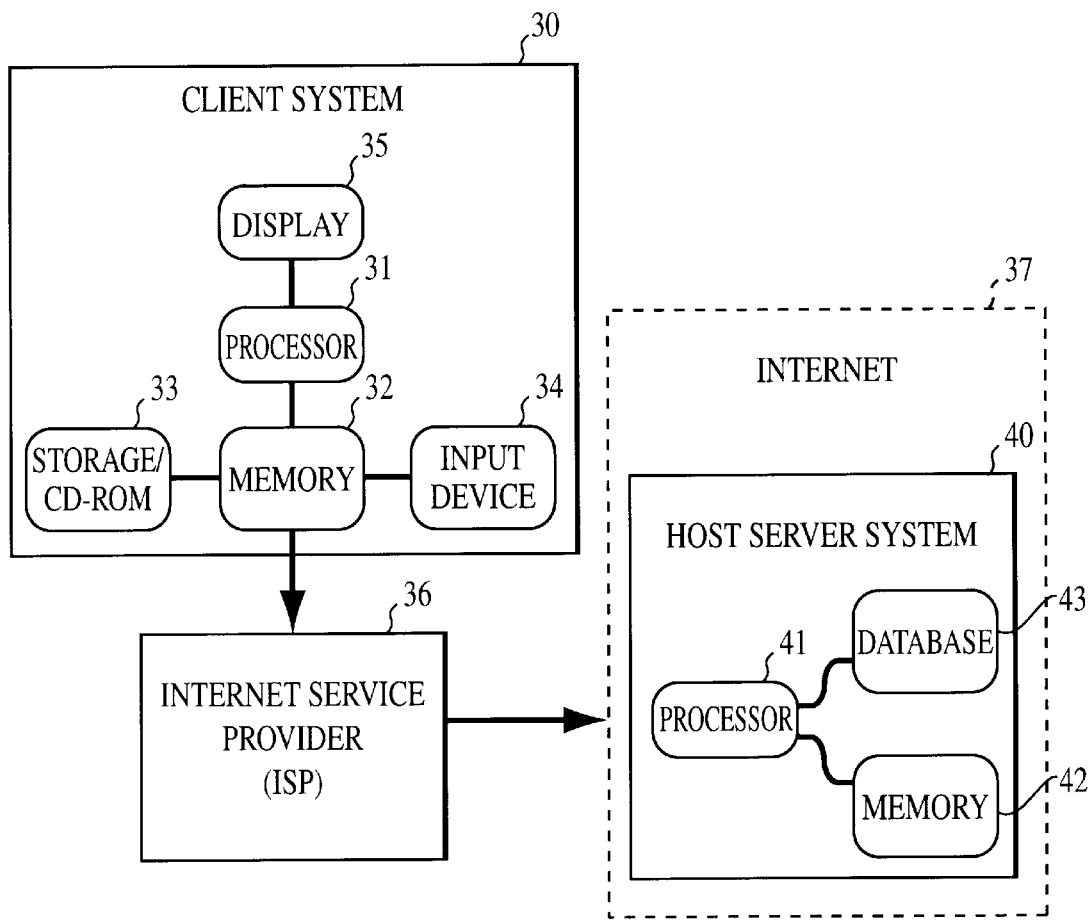
FIG. 2B is a schematic block diagram of a client computer running a client application according to the present invention connected to a server site on the Internet.

FIG. 2B shows a schematic block diagram of a client computer 30 running a client/server application according to the present invention connected to a server site 40 on the Internet 37. Client computer 30 includes a processor 31 connected to each of a memory 32, a storage device and/or CD-ROM 33, an input device 34 and a display 35 in a well-known manner. Memory 32 includes instructions and information for the client application. Storage device and/or CD-ROM 33 can also include instructions and information for use by the client application. That is, storage device and/or CD-ROM 33 include a storage area having information that is readable by processor 31 and tangibly embodies a program of instructions executable by processor 31. Storage device 33 can be a hard drive or a ROM, for example. Input device 34, such as a keyboard and/or a mouse, accepts user inputs that are processed by processor 31 in accordance with the instructions and information for the client application stored in memory 32 and storage device and/or CD-ROM 33. Display 35 provides a visual interface to client computer 30 in a well-known manner, such as by providing a graphical user interface (GUI) (FIG. 2C) in accordance with instructions and information stored in memory 32 and storage device and/or CD-ROM 33 for the client application. Client computer 30 can include other components that are not shown.

Client computer 30 is connected to Internet 37 through Internet service provider 36, such as by a modem (not shown). Server system 40 is also connected to Internet 37 in a well-known manner. Server system 40 can be an internet protocol (IP) based computer network or a server site. In either case, server system 40 includes a processor 41 connected in a well-known manner to a memory 42 and to a database 43. Memory 42 stores instructions, such as scripts, and information that together provide token handlers for tokens received from Internet 37. Processor 41 uses the instructions and information stored in memory 42 to operate on received tokens in accordance with the appropriate token handler. For example, when an object request token is received and validated by the appropriate token handlers, processor 41 accesses database 43 in a well-known manner for retrieving the requested objected. Server system 40 can include other components that are not shown.

There are two types of online resources that can be accessed by the present invention. For the first type of online resource, the client application automatically contacts a specific online server site resource as a background process under control of the application. Preferably, the online server site provides user authentication services and file storage. After user verification, data is transferred from the online site to the application and is stored in specified directories under control of the application. The connection to the online site is always under the control of the application. For the second type of online resource, the application launches a web browser as a foreground process for accessing a specific online server site. When the web browser is launched, a uniform resource locator (URL) information and any other required connection parameters are passed for connecting with the online resource. When the user is finished interacting with the online resource and/or browsing the web, the user manually switches control back to the application.

Figure 2C:
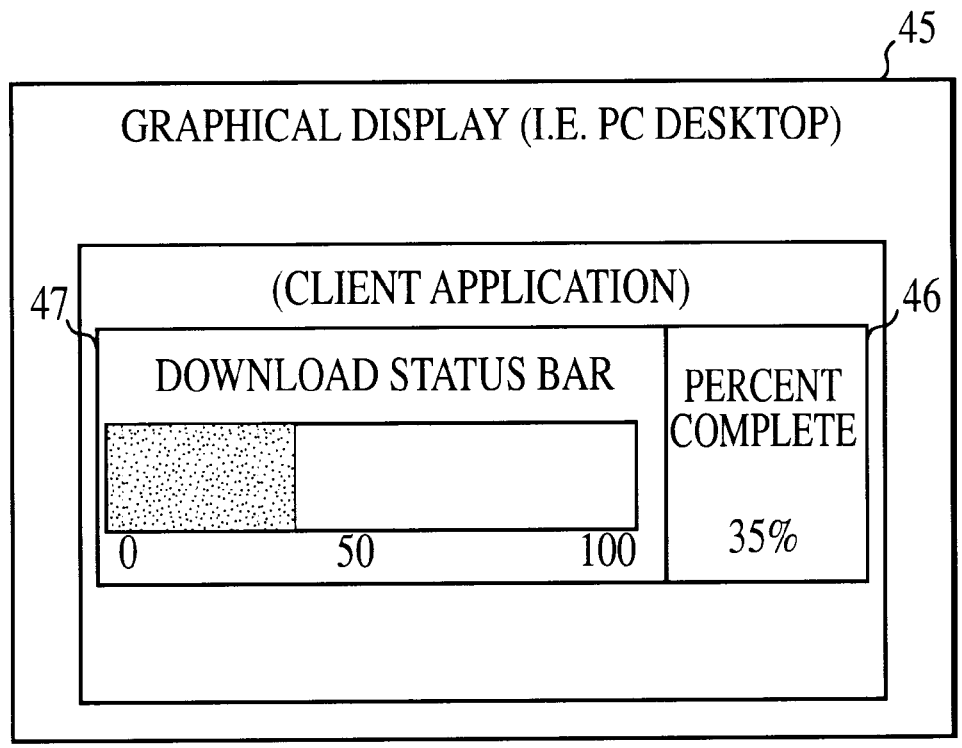
FIG. 2C shows an exemplary graphical display of status of an object request.

The most interaction that a user may experience when a connection is made is a dialog from the ISP prompting the user for a user identification information and a password. The user identification information and password can be stored by the client application and automatically passed to the ISP when a connection to the ISP is established. Since each ISP handles availability and receipt of user identification information and password information differently, this step in the connection process varies between providers accordingly. All other communications, such as data transfers, are reported to a user by a status bar and/or an animated icon appearing in the client applications interface so the user can visually verify that a transfer is occurring, and the approximate percentage of completion of the transfer. FIG. 2C shows an exemplary graphical display 45 that is displayed on display 35 in FIG. 2B. Graphical display 45 includes an exemplary status bar 46 and an exemplary animated icon 47 that communicate the status of a data transfer to a user.

The information passed to an online resource site from an application incorporating the present invention are HTTP tokens containing information for gaining access to the online resource site and for gaining access to the requested information. There are three token types used by the present invention: a registration token, an identification token and an object request token. A registration token is used the first time that a user connects to an online resource, or whenever registration information changes, such as when a new ISP is selected. An identification token is used the first time during each session that a user requests an online component, thus identifying the user to the online resource. A object request token is used for requesting objects from an online resource.

A token containing information for transmission exists in a native format in the programming language structure used by the application, such as a C++ structure. Before transmission, the token is converted at the application level from a native format token into a token in a URL-encoded format. The URL portion of the encoded token determines the destination of the token and the server application that will process the token. The body of the token contains information as a series of name=value pairs. The names and data types of the fields are coordinated between the client and the server applications. The application calls a series of TRUE/IP functions to create the URL and body of the token. The application passes the URL-encoded token to the TRUE/IP layer of the present invention for transmission. The TRUE/IP layer converts the URL-encoded token into a Hypertext Transfer Protocol (HTTP) request token using an HTTP POST method for transmitting the name=value pairs as a data body to the online resource. The data body is a specified number of bytes in the logical data stream following the request header. Other information, such as user identification and password information, is transmitted using HTTP request header fields that are generated by TRUE/IP function calls.

Figure 3:
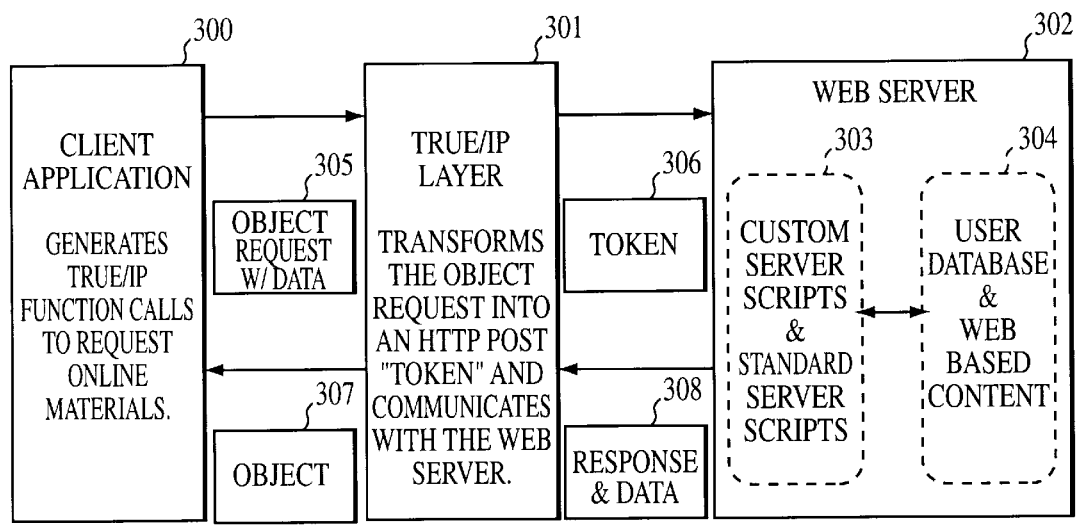
FIG. 3 is a functional block diagram showing an overview of information flow for an object request operation according to the present invention.

FIG. 3 is a functional block diagram showing an overview of information flow for an object request operation according to the present invention. In FIG. 3, a client application 300 communicates with a web server 302 through a TRUE/IP layer 301 of the present invention. Client application 300 provides object path information from local files and generates TRUE/IP function calls. The TRUE/IP calls generate object request tokens 305. The object request tokens 305 are transformed into HTTP POST request 306 by TRUE/IP layer 301. Standard HTTP header fields are used for handling user authentication, client identification, time-to-live, and other important aspects of client/server communications. Other token information is passed as name-value pairs in the body of a HTTP post request a client application sends to a server. The HTTP POST requests 306 are sent to web server 302. Web server 302 includes a token handler 303 and a user database 304. Token handler 303 is an application that processes common gateway interface (CGI) scripts written in Perl 5, for example. CGI scripts receive tokens 306, act on the input data by, for example, retrieving requested data from a relational database 304, and return a response 308 as an HTTP response header and an optional response body to client application 300. TRUE/IP layer 301 converts the HTTP response to the requested objects 307. The first three characters of a response 308 contain an HTTP status code indicating that the online transaction was successful (HTTP status code 200) or that an erroneous input value or server-side error prevented the transaction from be completed (any HTTP status code greater than 299). The client application responds to each status code appropriately.

Figure 4:
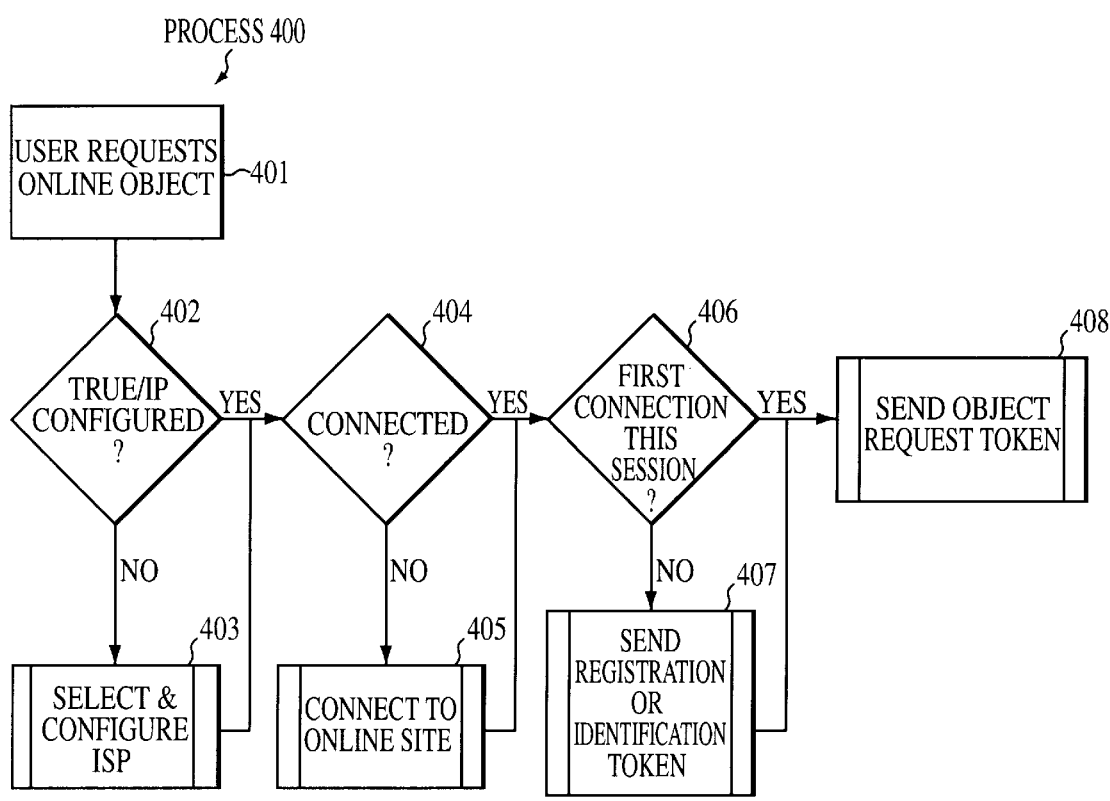
FIG. 4 shows a flow diagram for an online object request operation according to the present invention.

FIG. 4 shows a flow diagram for an online object request process 400 according to the present invention. At step 401, the user requests an online object. At step 402, the application determines whether it has been TRUE/IP protocol configured, that is, configured according to the invention for transparently interfacing to the online site through a selected ISP. If the user has not configured the application with one of the available connection types and ISPs, any calls to connect to an online resource return a not configured-type error message and at step 403 the user is prompted to select and configure an ISP. If the ISP subscribed to by the user does not support any outside control from other applications, the user is informed that the selected ISP is not supported by the present invention and is not compatible with pass-through Internet protocols. When the ISP is selected, the function will read all of the support Internet service provider dialer code dynamic link libraries (in the naming convention of DLR*.DLL) and return a text listing all of the ISPs each dynamic link library supports. This is then put into a dialog box for the user to select an ISP. Any information specific to an individual ISP is accessed through a "Configure" button provided on the ISP selection dialog. If an ISP does not require any special settings, this button will be grayed out and is not available to be selected. To further facilitate a seamless nature of the interface, each ISP module has an Autoconfigure function that attempts to gather as much information as possible by searching the operating system environment and storage devices for ISP specific files and data. Flow then continues to step 404.

If the application has already been TRUE/IP configured, the flow continues to step 404 where it is determined whether the client application is currently connected to the online site. If the application is not currently connected, the application becomes connected at step 405 by accessing the server site through the selected ISP and flow continues to step 406. If the application is already connected to the online server site, flow continues to step 406 where it is determined whether the client application is being connected for the first time for the current session. If not, flow continues to step 407 where the client application sends a registration token, or an identification token, to the online site. Flow then continues to step 408. If the client application is not being connected for the first time for the current session, flow continues to step 408 where the object request token is sent to the online site.

An example in pseudocode showing of an object request token follows:

```
// Create and initialize a request object
pRequestUrl = new CRequestUrl;
// Assign the needed URL address to the remote host
pRequestUrl- > Url = needed URL address;
// Assign the destination for the file to be placed on local system
pRequestUrl- > Destination = destination on local system;
// If a custom callback is used, specify it
pRequestUrl- > CallbackFunction = custom callback function;
// Call CTrueIp::RequestUrl with needed information
CTrueIp::RequestUrl(pRequestUrl);
If RequestUrl() does not a return a success,
    perform error exception routines
```

Figure 5:
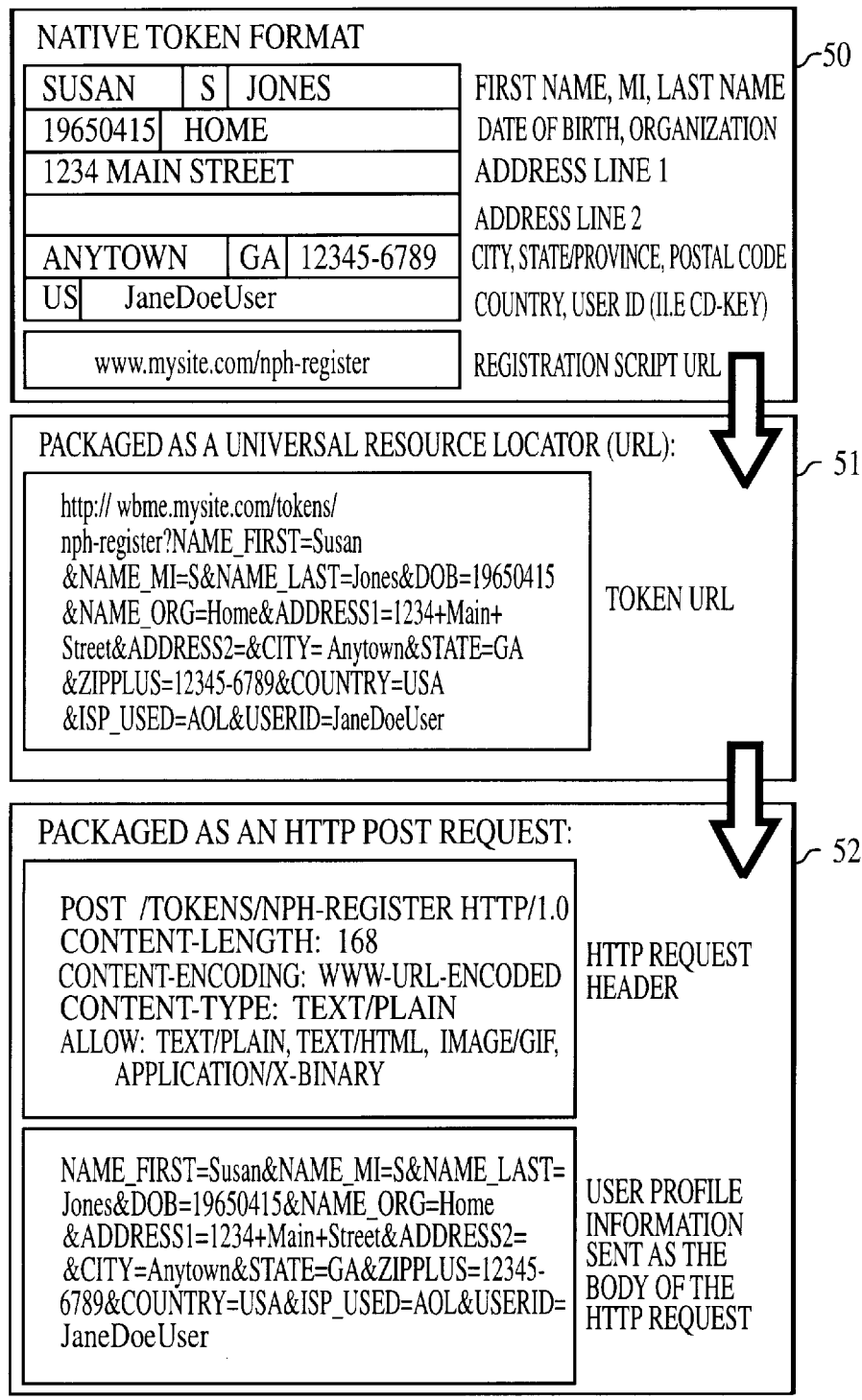
FIG. 5 shows intermediate steps of a process for generating an exemplary registration token according to the present invention.

When a registration operation is performed, a registration token containing user identification information, such as a CD Key, a serial number from the CD-ROM packaging or another uniquely defined user identification, is used for registering the client application with the server site. FIG. 5 shows intermediate stages in a process for generating a registration token. User information, such as name, address, etc., is initially entered via a dialog box 50 during installation of the application, for example. The user information is converted to a URL token at 51. The URL token is converted to an HTTP POST request at 52. A one-to-one association is then established in a user registration database at the online resource site between each user and the user's application based on user identification information.

The online server site has a registration token handler for processing registration information (handler 302 in FIG. 3). The example token handler does not require any special HTTP headers, because it uses CGI-type variables, such as the following name=value pairs:

NAME_FIRST=user's first name
NAME_MI=user's middle initial
NAME_LAST=user's last name
DOB=user's date of birth (yyyymmdd)
NAME_ORG=name of the place where the product is installed
ADDRESS1=first line of the user's street address
ADDRESS2=second line of the user's street address
CITY=user's city
STATE=user's state or provincial abbreviation
ZIPPLUS=user's ZIP or postal code
COUNTRY=user's 2–3 letter country code (e.g., USA)
ISP_USED=user's Internet Service Provider
USERID=User Identification from the product In response to receiving a registration token, the example token handler returns one of the following HTTP status codes:

201: The token handler succeeded in creating or updating the user record in the registration database.
401: The token did not include a User ID, or the User ID was invalid.
500: The token handler failed because of a database or other server-side error.

Information gathered during an installation process, or at any other time as specified by the client application, can be used for allowing a user to register an application electronically with the online site. The gathered information is sent to the online server site as a registration token when the first request for an online object is processed, or during installation of the application, for example. In the case where a registered user is re-installing the application, or modifying registration information, such as selecting a different ISP, the online account is re-established by, for example, re-entering registration information. A user can also manually register by supplying user information to the online server site by, for example, using a registration card, calling a specified telephone number, or sending user information via facsimile to a specified telephone number. The manually-supplied registration information is then used by the server site when the user accesses the site for the first time.

User identification information, or some other information, such as a CD-key, is included in a string that is sent to the online site when resources are requested. Each user can be assigned a password for gaining access to the online site and for user tracking purposes. The first time that a user accesses an online site, a new account is created and associated with the user registration information. Subsequent accesses to the online site can track the user as a registered user.

Figure 6:
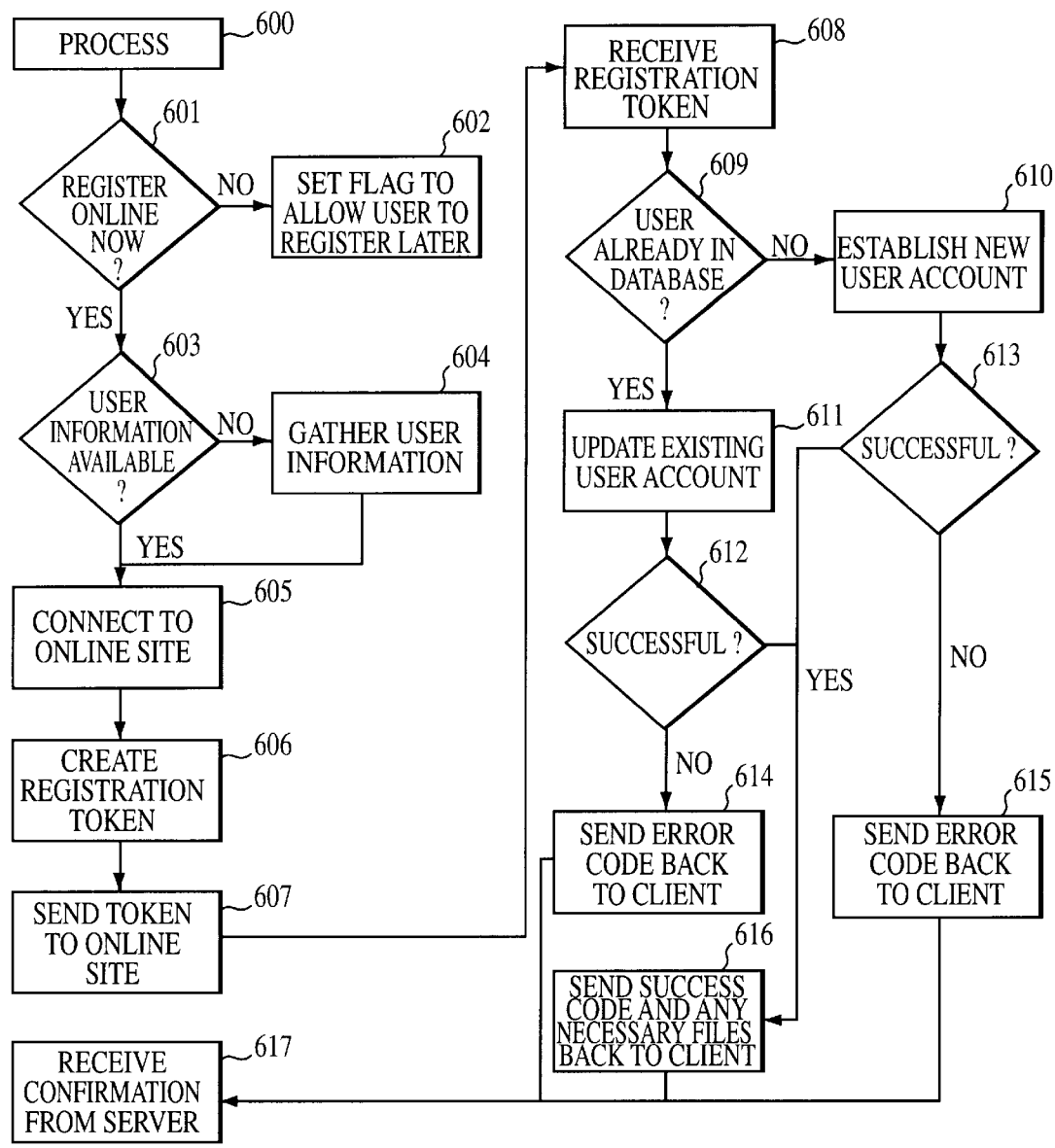
FIG. 6 shows a flow diagram for an online registration operation showing client and server interaction according to the present invention.

FIG. 6 shows a flow diagram for an online registration process 600 showing a client and server interaction. Process 600 corresponds to step 407 of process 400. At step 601, it is determined whether the user desires to register the client application now or later. If later is desired, a flag is set at step 602 allowing the user to register later. If registration is presently desired, it is determined whether the user information is available at step 603. If not, the user information is gathered at step 604. If the user information is available, the application connects to the online site at step 605. At step 606, a registration token is created and at step 607, the registration token is sent to the online site. At step 608, the registration token is received by the online site. At step 609, it is determined whether the user is already listed in a database. If not, a new user account is established at step 610. At step 613 is it determined whether a new user account is successfully established. If not, an error message is sent to the client application at step 615, which is received by the client application at step 617. If the new user account is successfully established, a success code message and any necessary files are sent to the user at step 616 and are received at step 617.

If the user is listed in the database, the existing user account is updated at step 611. At step 612, it is determined whether the user account was successfully updated. If not, an error code is sent to the client application at step 614 which is received by the client application at step 617. If the user account was successfully updated, a success code and any necessary files are sent at step 615 and received at step 617.

A psuedocode example showing how a registration token is used follows:

```
// Create and initialize a request object
pRequestUrl = new CRequestUrl;
// Assign the registration URL address to the remote host
pRequesturl- > Url = registration URL address;
// Assign the destination for the file to be placed on local system
pRequestUrl- > Destination = destination on local system;
// If a custom callback is used, specify it
pRequestUrl- > CallbackFunction = custom callback function;
// Assign name-value pairs to send to host
pRequestUrl- > SetNameValuePairs(USERID, User Identification information);
pRequestUrl- > SetNameValuePairs(NAME__FIRST, user's first name);
pRequestUrl- > SetNameValuePairs(NAME__MI, user's middle initial);
pRequestUrl- > SetNameValuePairs(NAME__LAST, user's last name);
pRequestUrl- > SetNameValuePairs(DOB, user's date of birth);
pRequestUrl- > SetNameValuePairs(NAME__ORG, user's organization);
```

-continued

```
pRequestUrl- > SetNameValuePairs(ADDRESS1, user's address line 1);
pRequestUrl- > SetNameValuePairs(ADDRESS2, user's address line 2);
pRequestUrl- > SetNameValuePairs(CITY, user's city);
pRequestUrl- > SetNameValuePairs(STATE, user's state);
pRequestUrl- > SetNameValuePairs(ZIPPLUS, user's zip code);
pRequestUrl- > SetNameValuePairs(COUNTRY, user's country);
pRequestUrl- > SetNameValuePairs(ISP__USED, user's selected ISP);
// Call CTrueIp::RequestUrl with needed information
CTrueIp::RequestUrl(pRequestUrl);
If RequestUrl() does not a return a success,
    perform error exception routines
```

Figure 7:
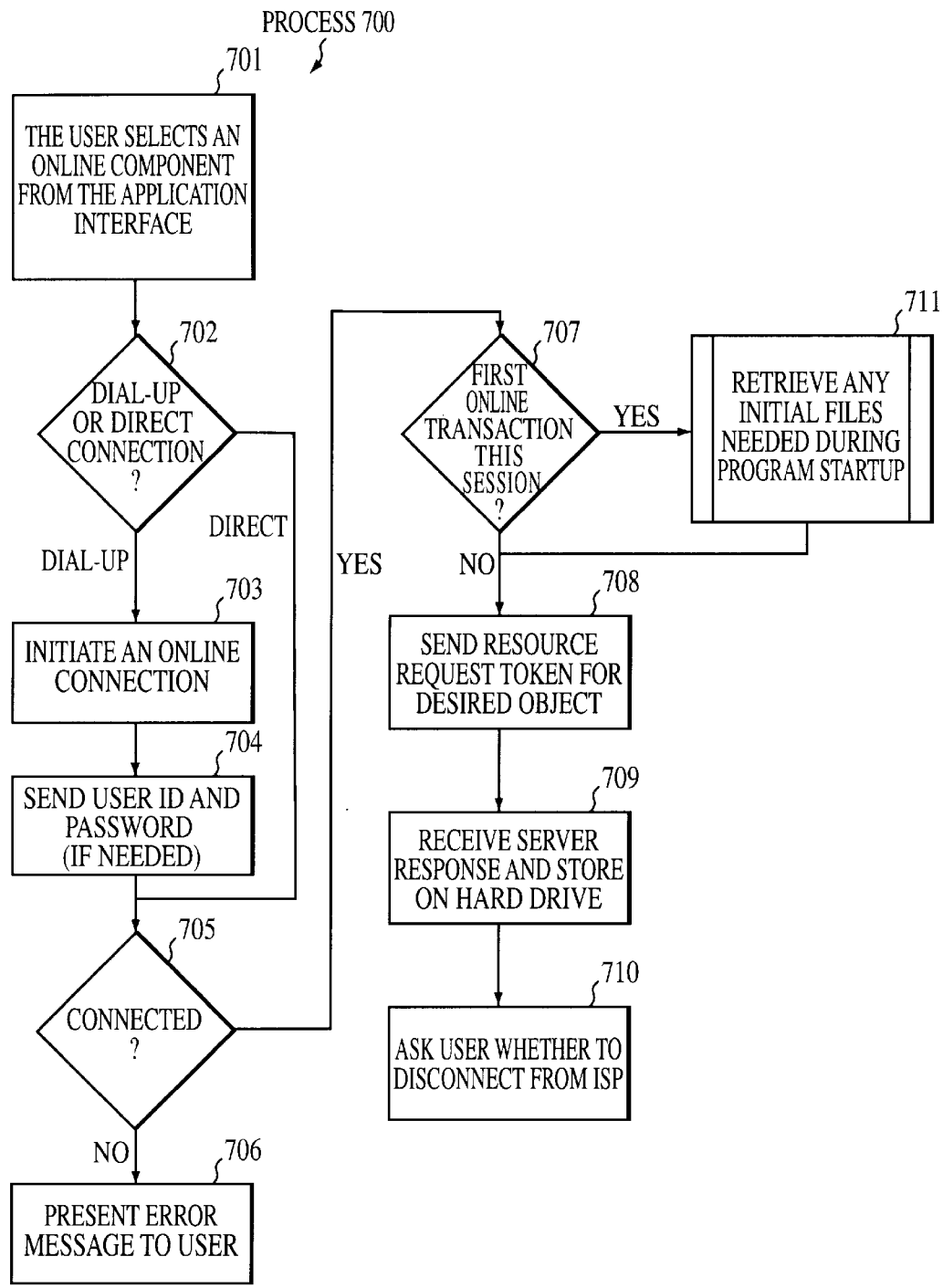
FIG. 7 shows a flow diagram for a preferred communication process flow according to the present invention.

FIG. 7 shows a flow diagram for a preferred communication process 700 according to the present invention. At step 701, a user selects an online component from the application interface, such as a request for updated data. At step 702, it is determined whether the connection to the online resource is to be by a dial-up connection or a direct connection to the Internet. If the connection is to be directly to the Internet rather than through a commercial ISP, flow proceeds to step 705. If a commercial ISP is to be dialed up, an online connection is initiated at step 703. At step 704, the user identification and password is sent to the ISP. At step 705, it is determined whether the application is connected to the online resource. If not, flow proceeds to step 706 where an error message is presented to the user. If the application is connected to the online resource at step 705, at step 707 it is determined whether the current request is the first online transaction this session. If so, any initial files needed during program start-up are retrieved at step 711. Flow then proceeds to step 708, where a resource request token for the desired object is sent. At step 709, the server response is received and stored in an appropriate directory on the requesting system hard drive. At step 710, the user is prompted for whether the connection to the online resource should be closed.

Figure 8:
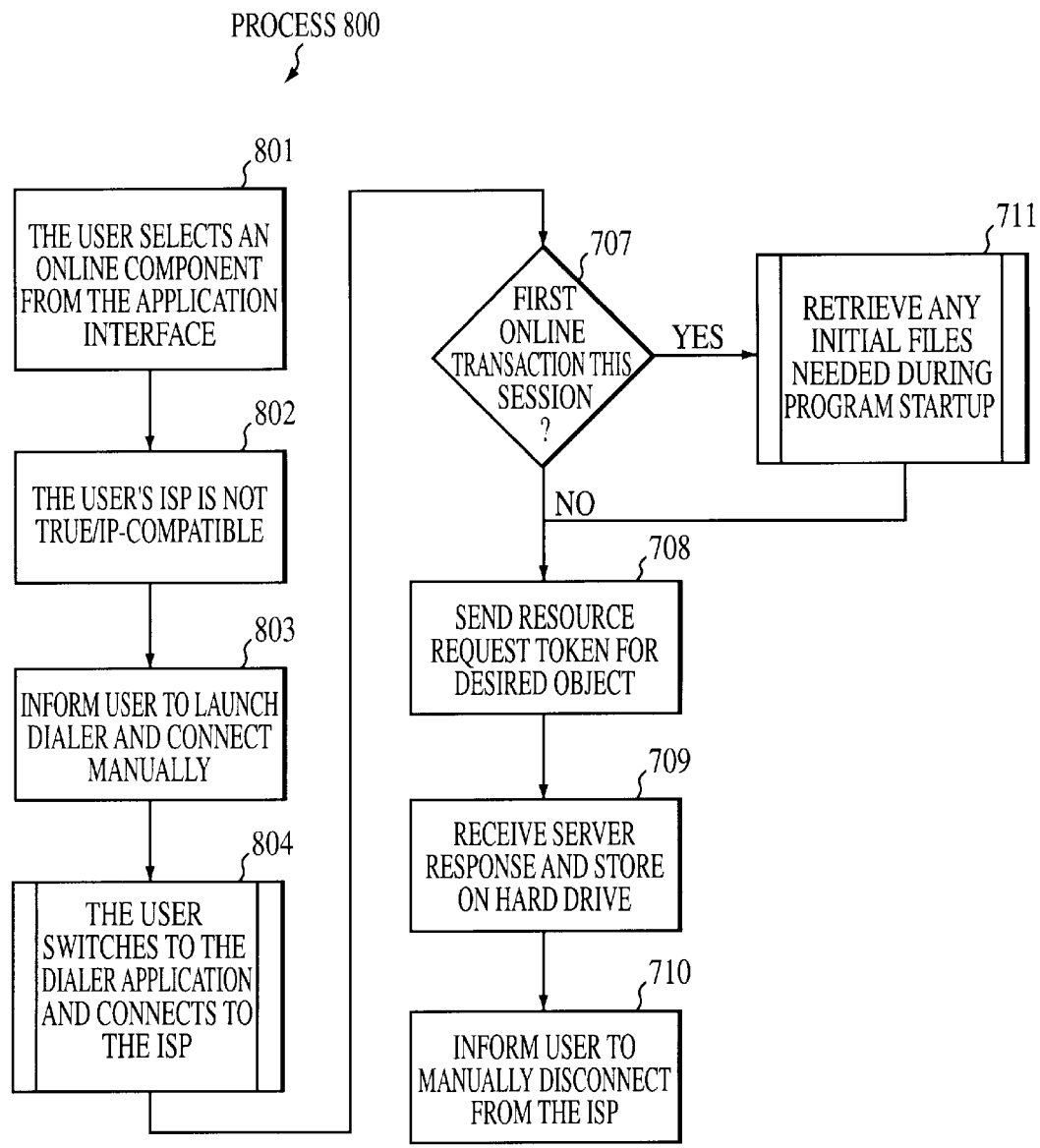
FIG. 8 shows a flow diagram for an alternative communication process flow according to the present invention.

FIG. 8 shows a flow diagram for an alternative communication process flow 800 according to the present invention that requires more user interaction than process 700. This situation would occur when the ISP of the user is not supported by the TRUE/IP layer of the present invention for launching the connection to the Internet, but still allows communications through normal HTTP communications once a connection is established. Any connections to the Internet through the ISP software requires manual intervention by the user.

In either process 700 or 800, any communications are still apparent to the user by a status bar, animated icon, or any other indicator in the client applications interface allowing the user to see the status of a transfer taking place, and approximately how much of the transfer is complete. The present invention provides a default indicator shown in FIG. 2C.

At step 801 in FIG. 8, a user selects an online component from the application interface. At step 802, it is determined that the selected ISP is not compatible with the TRUE/IP protocol of the present invention. At step 803, the user is informed to launch the dialer and connect to the ISP manually. At step 804, the user switches to the dialer application and connects to the ISP. Subsequently, the process flows through steps 707 to 711, which were described in connection with FIG. 7.

When a disconnection from the Internet occurs because of inactivity time-out or some other ISP/operating system error in either process 700 or 800, the entire process is repeated the next time the user selects an online resource from the client interface.

When a client application requires updating with code patches, or data updates, a request object function of the TRUE/IP protocol of the present invention can be used for retrieving a software module for automatically updating the application with little or no involvement of the user. The user is made aware that the update will take place, and is given the option for cancelling the update. The update can retrieve an executable file that, when run, patches existing files, replaces files entirely, adds new files to the program, or any combination of these functions.

Figure 9:
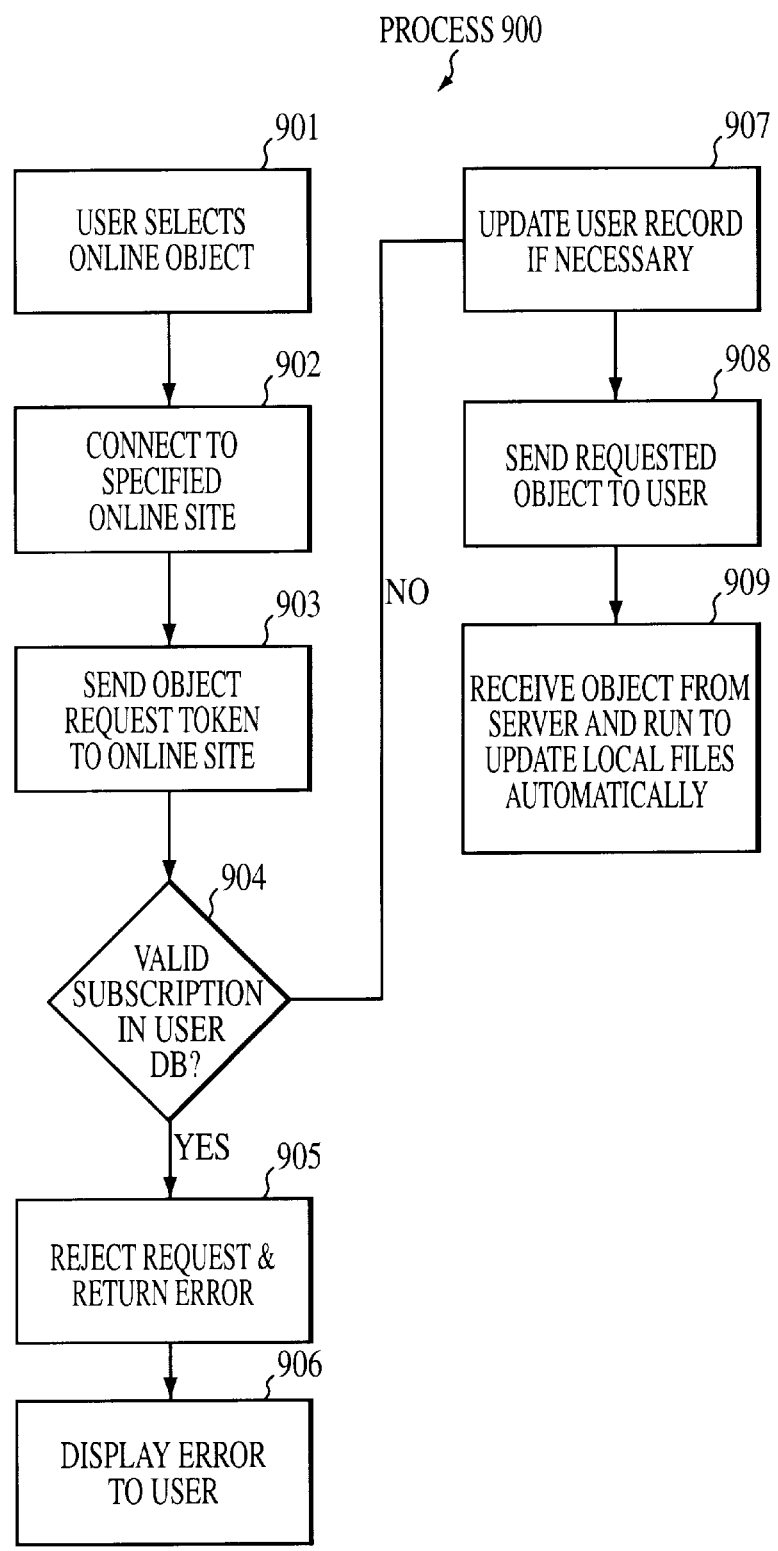
FIG. 9 shows a flow diagram for an online update operation according to the present invention.

FIG. 9 shows a flow diagram for an online update process 900 according to the present invention. At step 901, a user selects an online object. At step 902, the client application is connected to a specified online site using, for example, connection process 700 or 800. At step 903, the object request is sent to the online site. At step 904, it is determined whether the user has a valid subscription listed in a database associated with the online site. If not, the request is rejected and an error message is returned at step 905. At step 906, the error message is displayed to the user. If the user has a valid subscription listed in the database, the user record is updated, if necessary, at step 907. At step 908, the requested object is sent to the user. At step 909, the object is received and run locally for automatically updating the files.

An identification token is sent to an online resource from a client application the first time during a session that a user requests an online component so that the user is identified to the server. Any return file from the online server responding to the object request contains requested update files and the respective system data. A psuedocode example showing how an identification token is used follows:

```
// Create and initialize a request object
pRequestUrl = new CRequestUrl;
// Assign the identification URL address to the remote host
pRequestUrl- > Url = identification URL address;
// Assign the destination for the file to be placed on local system
pRequestUrl- > Destination = destination on local system;
// If a custom callback is used, specify it
pRequestUrl- > CallbackFunction = custom callback function;
// Call CTrueIp::RequestUrl with needed information
CTrueIp::RequestUrl(pRequestUrl);
If RequestUrl() does not a return a success,
    perform error exception routines
```

From the perspective of a client application programmer, the TRUE/IP protocol of the present invention provides a common coding interface that allows access to the Internet through any one of a plurality of Internet service providers. Thus, creation of an Internet-aware application is simplified because a client application programmer is neither required to understand complicated communication protocols, nor needs to deal with multiple ISPs for interfacing through their respective proprietary interfaces.

Figure 10:
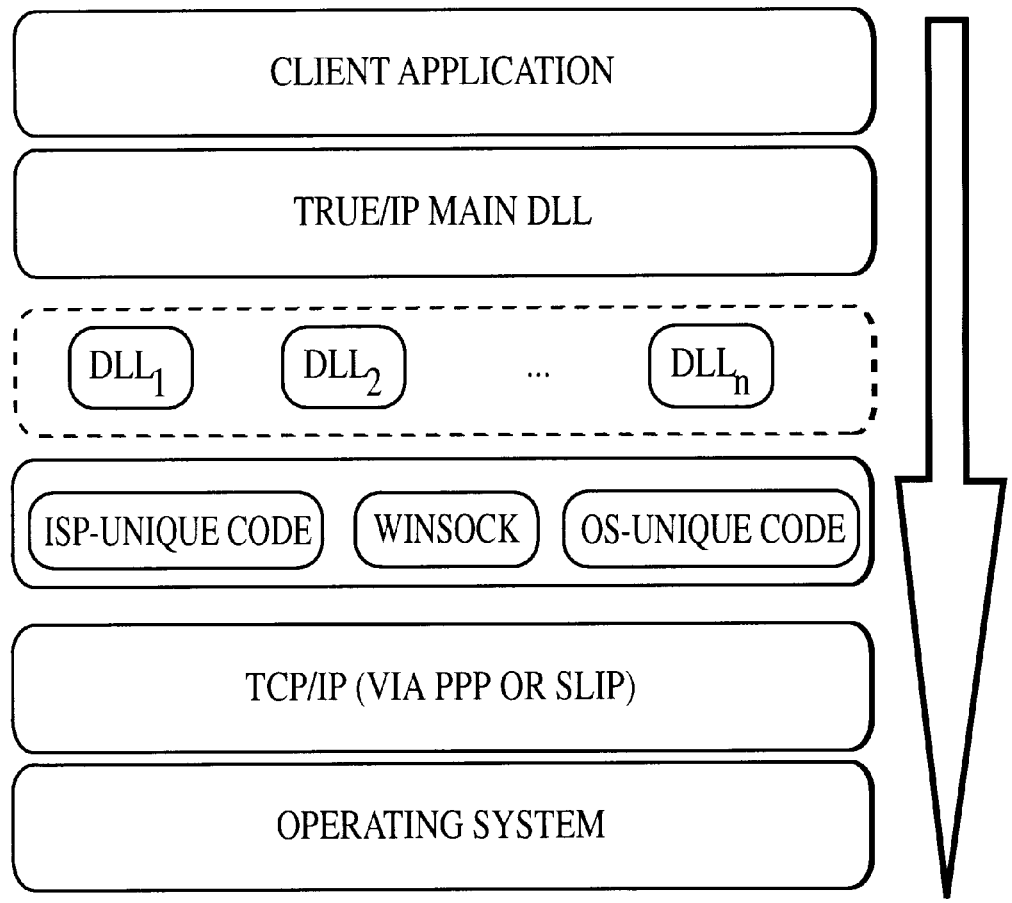
FIG. 10 is an architectural hierarchy diagram showing details a nd location of the layers, as related to the client system components, of the present invention.

FIG. 10 is an architectural hierarchy diagram showing the layers of the present invention. The TRUE/IP protocol of the present invention uses Windows dynamic link libraries (DLLs) for transparently interfacing commands generated by the client application to commands used by an ISP, whether the ISP uses a point-to-point protocol (PPP) or a serial line Internet protocol (SLIP) for communicating over the Internet.

Modules are implemented for each Internet service provider as a Windows dynamic link libraries (DLL) included with a client application. Modules are shared among ISPs having common interfaces. The design of the MAIN.DLL allows for convenient addition of new ISPs, or updates of existing supported ISPs. A "null" DLL is provided as a default for indicating that no ISP has been selected. The return values of all functions in the null DLL indicate that the ISP configuration has not been completed. Any configuration information gathered is stored in a TRUEIP.INI file for retrieval during configuration and initialization. A client application incorporating the present invention is also capable of providing a function for status having the capability of interpreting percentage and fill status bar during a download transaction. Additionally, an application is capable of forming token structures, such as a registration token, an identification token, and an object request token, and providing all of the DLLs on a user's hard drive.

The application programmer interface for the present invention provides a main header file containing all of the information necessary for a MAINDLL. A provider header is also included containing all of the information needed for each provider DLL. One header is used with all of the supported provider DLLs, allowing an ISP selected by a user to be used with the application function calls.

The application programmer interface according to the present invention includes the exemplary commands listed below in a generalized format:

CTrueIp::Configure
Function: Presents a user with a list of supported ISPs from which the user selects for communication with an online site.
Declaration: STATUS CTrueIp::Configure( );
Return Value: The Configure function returns a status value indicating whether the configuration was altered.
Parameter: None
Description: Configure( ) creates a list of available ISPs by accessing all support DLLs in the current directory. Each DLL is loaded and the entry point dIrInformation( ) is called. The returned information is the list of available ISPs and is presented to a user in a dialog. If the user selects an ISP from the list and chooses SAVE, the selected ISP DLLs are stored in the TRUEIP.INI file. The selected ISP DLLs are loaded and the entry point dIrConfigure( ) is called for performing an ISP specific configuration. If the user does not select an ISP from the list, the null ISP DLLs are automatically chosen.

CTrueIp::Initialize
Function: Prepares an ISP interface for use.
Declaration: STATUS CTrueIp::Initialize( );
Return Value: The Initialize function returns a value indicating success or failure of a call to an ISP.
Parameters: None
Description: Initialize( ) is called in a session for preparing an ISP dialer module for use. The particular DLL is found by retrieving the DLL file name from the TRUEIP.INI file. The entry points of the configured DLLs are loaded into memory. This is preferably performed upon starting the host application and after the user has modified the configured ISP.

CTrueIp::RequestURL
Function: Initiates a request for information from an online site.
Declaration: STATUS CTrueIp::RequestURL(url string, path string, name-value pairs, pointer to callback function);
Return Value: The RequestURL function returns a value indicating success or failure of the function call.
Parameters: url: A string containing URL of the requested object.
    path: A string containing the fully qualified path name of the destination object.
    name-value: Variables and values added to the HTTP wrl string (optional).

callback: Function for displaying status of object transfer. If NULL, uses TRUE/IP default callback.

Description: RequestURL( ) is called for retrieving an object from an Internet server. The callback function pointer is used for sending status information to a client application, allowing the client application to use a custom display. (If NULL is specified for the callback function, the TRUE/IP default callback is used).

CTrueIp::Cancel

Function: Cancels a request for information from an online site.

Declaration: STATUS CTrueIp::Cancel(url string, url path);

Return Value: The Cancel function returns a value indicating success or failure of the function call.

Parameters: url: String containing URL of the requested object.
path: String containing the fully qualified path name of the destination object.

Description: Cancel( ) is called for halting a request being processed by RequestUrl( ). This will only remove the request indicated by the information in the cancel parameters. If several requests are to be canceled, then Cancel( ) must be called for each operation to be halted.

DefaultCallbackFunction

Function: Default callback function for displaying a status dialog showing the progress of each requested object.

Declaration: void DefaultCallbackFunction(url string, file size in bytes, total bytes received)

Return Value: None

Parameter: url: String containing URL of object requested.
total file size: Total size of requested file in bytes.
bytes received: Total number of bytes downloaded so far.

Description: DefaultCallbackFunction( ) provides completion information for the transfer being performed. A window is created and updated with each call. When all files are completed, the status display is be closed.
This code is provided to an application programmer as an example of how to create a customized callback.

CTrueIp::LaunchBrowser

Function: Causes a dialer module for a selected ISP to start a web browser.

Declaration: STATUS CTrueIp::LaunchBrowser(url string);

Return Value: The LaunchBrowser function returns a value indicating success or failure of the function call.

Parameter: url: Optional URL string for the page to be accessed by the browser on startup. If null, the browsers default home page is displayed.

Description: LaunchBrowser( ) causes the ISP browser to be started. The optional url, if passed, specifies the page to display upon startup. If url is not passed, the default page of the browser is displayed. The command calls to the dlrLaunchBrowser( ) command.

CTrueIp::IsConnected

Function: Returns the status from a DLR support module of a host connection.

Declaration: STATUS CTrueIp::IsConnected( );

Return Value: The IsConnection function returns a value indicating success (connected/disconnected) or failure of a call.

Parameter: none

Description: IsConnected( ) calls to a selected ISPs dialer for learning whether a connection to a host is established. The command calls to the dlrIsConnected( ) command.

CTrueIp::Connect

Function: Called during a session for connecting to a configured ISP.

Declaration: STATUS CTrueIp::Connect( );

Return Value: The Connect function returns a value indicating success or failure of a call.

Parameters: None

Description: Connect( ) establishes a connection with a selected ISP. The command calls to the dlrConnect( ) command.

CTrueIp::Disconnect

Function: Called during a session for disconnecting from a configured ISP.

Declaration: STATUS CTrueIp::Disconnect( );

Return Value: The Disconnect function returns a value indicating success or failure of a call.

Parameters: None

Description: Disconnect( ) terminates a connection with a selected ISP. The command calls the dlrDisconnect( ) command.

CTrueIp::SetAuthorizationInfo

Function: Must be called once per session (before any communications occur) for initializing an HTTP Authorization header.

Declaration: STATUS CTrueIp::SetAuthorizationInfo(user id string, user password string, realm string, host string);

Return Value: The SetAuthorizationInfo function returns a value indicating success or failure of the function call.

Parameters: user id: String containing user identification (i.e., the CD-KEY)
user password: String containing a user password (i.e., the CD-KEY)
realm: String for identifying the realm defined on a host server (i.e., My_Server_Tokens)
host: String for identifying the IP name of a host server (i.e., www.mysite.com)

Description: SetAuthorizationInfo( ) initializes values used in the HTTP Authorization header for validating a user's access to host site files.

CTrueIp::Close

Function: Called once per session for terminating connection with ISP dialer and support module.

Declaration: STATUS CTrueIp::Close( );

Return Value: The Close function returns a value indicating success or failure of the function call.

Parameters: None

Description: Close( ) closes an active ISP dialer and support module, and cleans up any state information.

The following exemplary functions are called by the exemplary TRUE/IP functions listed above. The functions below are specific to each ISP application programmer's interface.

dlrConfigure Initiates a configuration dialog for a DLR application. Information gathered is stored in ISP specific locations in the TRUEIP.INI file.

dlrInformation Returns descriptive information concerning a DLR interface.

dlrInitialize Sets information concerning a DLR interface.

ispRequestUrl Requests file from a connected host.

ispCancel Cancels a requested file transmission from a connected host.

ispStatus Returns the status of the last operation performed by the ISP functions dlrConnect Connects to a selected ISP.

dlrIsConnected Checks the status of a connection to a host.

dlrDisconnect Disconnects from a selected ISP.

dlrLaunchBrowser Launches an ISP specific web browser.

ispSend Transmits a block of data to a specified port.

ispReceive Receives a block of data from a specified port.

The type STATUS is the return type from all functions calls. Any return code has a major (a TRUE/IP translated code) and minor value, where the minor value has more specific information regarding the major category value. The return codes are listed in files associated with the TRUE/IP protocol of the present invention that are included with a client application. If available, text strings are returned with an error providing a detailed description of the reason for failure. Errors associated with a client application token are defined by a developer for each token sent by the client application. A representative listing of exemplary return codes is as follows:

TRUE/IP has not been configured;
TRUE/IP has not been initialized;
The specified file was not found;
The URL transfer has been canceled;
The host has broken connection without a valid HTTP response header; and
Not enough resources for remote connection.

The server-side of the TRUE/IP protocol of the present invention is preferably implemented as a collection of common gateway interface (CGI) scripts for handling communications between a client and a server under the HTTP protocol. Server-side TRUE/IP protocol applications can be readily developed in any programming language/environment that allows an input to be read from the Standard Input Stream (stdin), and allows an output to be written to the Standard Output Stream (stdout) because such applications conform to the CGI specification. The pseudocode examples given below are in Perl 5, the most popular language for developing CGI scripts. Other common CGI scripting languages that can be used are, for example, C/C++, TCL, Python and server-side Java.

The full power and flexibility of the server-side aspect of the TRUE/IP protocol of the present invention is available when server applications are preferably executed in a non-parsed-header (nph-) mode. The nph-mode allows server scripts to respond to client requests by returning the full range of HTTP status codes. Without nph-mode, scripts always return the HTTP success (status code 200). While status information can be placed elsewhere in a response generated by the script, using nph-mode lets the script transmit status information in the HTTP status line, leaving the response body for providing data to the client. The nph-mode may be enabled, depending on the HTTP server software, by prefixing the name of server scripts with "nph-" or by storing the scripts in a special directory.

When a client/server communications system is defined using the TRUE/IP protocol of the present invention, a developer specifies a set of tokens that will be passed from the client to the server, and the set of responses the server will send back to the client. CGI scripts, called token handlers, are then written to handle the tokens. Generally, the token handlers will have the same names as the tokens they handle. For example, a registration token might be handled by a token handler called registration (or, more likely, nph-registration). For each token and its handler, a developer specifies the following:

a) The HTTP headers that are passed in the token from the client to the server, and the allowable values for each header.
b) The name-value pairs that are passed in the body of the token.
c) The HTTP status codes returned by the token handler. The status codes are selected for communicating certain conditions, and preferably use standard HTTP status codes when available and appropriate.
d) The contents of the token handler response, based on the returned status code.

The following code samples of a user authentication operation, a user registration operation and an online file retrieval operation, written in Perl 5, illustrate how to create token handlers for performing various functions according to the present invention. Setup code and subroutines are not shown in all cases in the interest of clarity and brevity.

There are three basic approaches for a user authentication operation that selectively allows users access to online information. For the first approach, the token handler can be protected by the HTTP server so that a user name and password are required for entry. In this case, a client application tries to access a token handler, and the HTTP server responds with a status code 403 and includes a WWW-Authenticate header. The client application calls the TRUE/IP SetAuthorizationInfo( ) function with a user name and password that are appropriate for the server and realm defined by the WWW-Authenticate header field, and then resends the token.

For the second approach, the token handler provides its own protection by checking an incoming token for an HTTP Authorization header that has been created by the SetAuthorizationInfo( ) function. If the header does not exist, or if the information contained in the header is not valid, the token handler returns a status code 403 and a WWW-Authenticate header with the appropriate realm name to the client application. The Authorization header may be validated (after base-64 decoding) by a database lookup or some other developer-defined identification system.

For the third approach, the token handler ignores the Authorization header and requires certain name-value pairs to be present. The handling procedures are similar the second user authentication approach. This approach is obviated if the Authorization header handles a developer's authentication requirements.

The following code fragment example shows the steps needed for implementing the second user authentication approach.

```
#!/usr/local/bin/perl
##########
# nph-sample1
# Sample token handler demonstrating user authentication
##########
use CGI qw(:standard);      # load the CGI package
my $token = new CGI;         # create object to hold token data
my ($user, $password) =      # decode and separate username & password
   base64decode($ENV{'HTTP-Authorization'});
# Look up user & password (how is up to the developer . . .)
unless &lookup($user, $password) {
  print &header(-status        => '401 Unauthorized',
         -type          => 'text/plain',
         -WWW-Authenticate => 'Basic realm = "Client_Token"');
}
# Process the valid user's token
# . . .
```

For a user registration operation, the following example shows a token handler performing a registration operation. For this example, user information is entered in a database.

```
#!/usr/local/bin/perl
##########
# nph-register
# Sample token handler to register a user in a database
##########
use CGI qw(:standard);      # load CGI package
use DBI;                     # load database access package
```

```
my $token = new CGI;
# Note how the token fields are named the same as the database columns
my @fields = qw(USERID NAME_FIRST NAME_MI NAME_LAST
                NAME_ORG ADDRESS1 ADDRESS2 CITY STATE
                ZIPPLUS ISP_USED);
my $field;
my $got_reqd_fields = 1;
# Check for required token fields
for each $field (qw(NAME_FIRST NAME_LAST ZIPPLUS USERID)){
  $got_reqd_fields & = $token- > param($field);
}
if ($got_reqd_fields) {
  my $database = DBI- > connect('my_database', 'dbadmin',
  'db_password')
| |
    &return_status(500, 'Couldn't connect to registration database');
  # Build the SQL Insert statement. It looks like this:
  #  INSERT INTO my_table
  (USERID,NAME_FIRST, . . . ,ISP_USED)
  #    VALUES ('JaneDoeUser','Jane', . . . ,'DLRW95.DLL')
  # except that it's all in one long line.
  my $sql = 'INSERT INTO my_table (';
  $sql .= join(',', @fields);
  $sql .= ') VALUES (';
  $sql .= join(',' grep("'$token- > param($_)'", @fields));
  $sql .= ')';
  # Send the SQL to the database
  if ($database- > do($sq1)) {
    &return_status(201, 'User Registered Successfully');
  } else {
    &return_status(500, 'Couldn't insert user registration record');
  }
} else {
  &return_status(400, 'Required fields missing');
}
sub return_status {
  my ($status, $message) = @_;
  print header(-status     => $status,
         -type             => 'text/plain',
         -Content-length   => length($message));
  print $message;
  exit(0);
}
```

For an online file retrieval operation, the following example code fragment shows how a token handler retrieves and returns to a client a file stored on the online server. The user authentication fragment above can be used for ensuring that only valid users retrieve files. This example returns a file from the online server file system. However, data can also be returned from a database or similar information from another source.

```
#!/usr/local/bin/perl
##########
# nph-get_object
# Sample token handler to process a Get_Object token. If the user's ID
# is valid, the script copies the requested object back to the client
# via STDOUT.
##########
use CGI qw(:standard);    # load the CGI package
my $token = new CGI;
my %mime_type = {'.gif' => 'image/gif',
           '.jpg' => 'image/jpeg',
           '.htm' => 'text/html'};
# Validate the user ID passed in the HTTP-Authorization header
my $user_auth = $ENV{'HTTP_AUTHORIZATION'}| |
  &return_status(401, 'Token must include Authorization header');
$user_auth = ~ m |^ Basic ([A-Za-z0-9+/=]+)$|i;
($user_id, $password) = split(/:/, &base64decode($1));
if (&valid_user($userid, $password)) {
  # get the object and send it back to the requester
  open(OBJ, ($path = $token- > param('file_path'))) | |
    &return_status(404, "Requested object ($path) is not accessible");
  # Determine requested object MIME type
  ($ext) = ($path = ~ \\./w{3}$/);
  my $type = $mime_type{$ext}| | 'text/plain';
  # Send the HTTP response header
  $num_bytes = -s $path;
  print header(-status     => '200 Document Follows',
         -type             => $type,
         -Content-length   => $num_bytes);
  # Send the requested file in the response body
  binmode(OBJ);
  while (<OBJ>) {print;}
  close(OBJ);
} else {
  &return_status(403, 'Invalid User ID/Password');
}
```

While the present invention has been described in connection with the illustrated embodiments, it will be appreciated and understood that modifications may be made without departing from the true spirit and scope of the invention.

What is claimed is:

1. A system for interfacing an application program in a computer with a selected one of a plurality of ISPs on the Internet, comprising:
   a memory in the computer storing a client application in the OSI Application Layer, said application providing a generic ISP accessing method as a native token format;
   a plurality of ISP-specific dynamic link libraries of code in said memory, each storing details for accessing a respective one of a plurality of ISPs on the Internet; and
   an interface program in said memory in the OSI Session Layer transforming a token from said application in said native format into a URL-encoded object request token by taking details of a selected ISP from one of said plurality of ISP-specific dynamic link libraries, and passing said URL-encoded object request token to an output program in the OSI Transport Layer.

2. A system comprising:
   a memory storing application instructions, the application instructions including a client application in the OSI Application Layer, said application providing a generic ISP accessing method as a native token format;
   a plurality of ISP-specific dynamic link libraries of code in said memory, each storing details for accessing a respective one of a plurality of ISPs on the Internet;
   an interface program in said memory in the OSI Session Layer transforming a token from said application in said native format into a URL-encoded object request token by taking details of a selected ISP from one of said plurality of ISP-specific dynamic link libraries, and passing said URL-encoded object request token to an output program in the OSI Transport Layer;
   a processor connected to the memory and being responsive to the application instructions establishing a connection with an online database through said selected ISP.

3. The system according to claim 2, wherein the memory includes at least one of a storage device and a CD-ROM.

4. The system according to claim 3, wherein the online database is stored and accessed via a server that is coupled to the Internet.

5. The system according to claim 4, wherein the online database is coupled to the Internet through an IP-based computer network.

6. The system according to claim 4, wherein the processor is further responsive to the application instructions by converting the URL-encoded format token into a hypertext transfer protocol (HTTP) request.

7. The system according to claim 4, wherein the processor is further responsive to the application instructions by converting the URL-encoded format token into a token formatted in a protocol selected from a group consisting of File Transfer Protocol (FTP), Mail, Telnet, Gopher, Network News Transport Protocol (NNTP), Chat, and Forums.

8. The system according to claim 2, further comprising a display showing status of the information retrieved from the online database.

9. The system according to claim 8, wherein the display displays the status graphically.

10. A system comprising:
an IP-based computer network;
a server computer coupled to the IP-based computer network and receiving a token from the IP-based computer network, the server computer including,
a server memory storing token handler instructions for the token, and
a server processor responsive to the token and the token handler instructions by processing the token; and
a client computer including,
a client memory storing client application instructions, the client application instructions including a set of dynamic link libraries of code and information for each of a plurality of IP-based computer network service providers, and
an interface program in said memory in the OSI Session Layer transforming a token from said application in said native format into a URL-encoded object request token by taking details of a selected ISP from one of said plurality of ISP-specific dynamic link libraries, and passing said URL-encoded object request token to an output program in the OSI Transport Layer;
a client processor connected to the client memory, and being responsive to the client application instructions, establishing a connection with the server computer over the IP-based computer network through a selected IP-based computer network service provider.

11. The system according to claim 10, wherein the IP-based computer network is the Internet, and the selected IP-based computer network service provider is an Internet Service Provider.

12. The system according to claim 11, wherein the server computer is coupled to the Internet through another IP-based computer network.

13. The system according to claim 11, wherein the server computer further includes at least one database connected to the server processor, and
wherein the token requests an object stored in one of the databases,
the server processor being responsive to the token by accessing one of the databases for the object and sending the object to the client computer.

14. The system according to claim 13, wherein the client computer further includes a display showing a status of the object sent to the client computer.

15. The system according to claim 13, wherein the display displays the status graphically.

16. The system according to claim 10, wherein the client memory includes at least one of a storage device and a CD-ROM.

17. The system according to claim 10, wherein the client processor is further responsive to the client application instructions by converting the URL-encoded format token into the token sent to the server computer, the token sent to the server computer being a hypertext transfer protocol (HTTP) request.

18. The system according to claim 10, wherein the client processor is further responsive to the client application instructions by converting the URL-encoded format token into the token sent to the server computer, the token sent to the server computer being formatted in a protocol selected from a group consisting of File Transfer Protocol (FTP), Mail, Telnet, Gopher, Network News Transport Protocol (NNTP), Chat, and Forums.

19. A method of accessing online data comprising the steps of:
storing application instructions in a memory, the application instructions including a a client application in the OSI Application Layer, said application providing a generic ISP accessing method as a native token format;
storing a plurality of dynamic link libraries of code in said memory, each storing details for accessing a respective one of a plurality of ISPs on the Internet;
selecting an Internet service provider from the plurality of Internet service providers;
converting a native format token of the application into a URL-encoded object request token by taking details of a selected ISP from one of said plurality of ISP-specific dynamic link libraries, and passing said URL-encoded object request token to an output program in the OSI Transport Layer; data;
establishing a connection with an online database through the selected Internet service provider; and
retrieving information from the online database.

20. The method according to claim 19, wherein the memory includes at least one of a storage device and CD-ROM.

21. The method according to claim 20, wherein the online database is a node on the Internet.

22. The method according to claim 19, further comprising the step of converting the URL-encoded format token into a hypertext transfer protocol (HTTP) request.

23. The method according to claim 19, further comprising the step of converting a URL-encoded format token into a token formatted in a protocol selected from the group consisting of File Transfer Protocol (FTP), Mail, Telnet, Gopher, Network News Transport Protocol (NNTP), Chat, and Forums.

24. The method according to claim 19, further comprising the step of displaying a status of the information retrieved from the online database.

25. The method according to claim 24, wherein the step of displaying the status displays the status graphically.

26. A method for accessing online information comprising the steps of:
storing token handler instructions in a server memory of a server computer coupled to an IP-based computer network;
storing application instructions in a client memory at a client computer, the application instructions including a client application in the OSI Application Layer, said application providing a generic ISP accessing method as a native token format;
storing a plurality of dynamic link libraries of code in said memory, each storing details for accessing a respective one of a plurality of plurality of IP-based computer network service providers on the Internet;
selecting an IP-based computer network service provider from the plurality of IP-based computer network service providers;

converting a native format token of the application into a URL-encoded object request token by taking details of a selected ISP from one of said plurality of ISP-specific dynamic link libraries, and passing said URL-encoded object request token to an output program in the OSI Transport Layer; data;

establishing a connection with the server computer over the IP-based computer network through the selected IP-based computer network service provider;

sending a token to the server computer over the IP-based computer network;

receiving the token at the server computer; and processing the token based on the token handler instructions stored in the server memory.

27. The method according to claim 26, wherein the IP-based computer network is the Internet, and the selected IP-based computer network is an Internet service provider.

28. The method according to claim 27, wherein the server computer is coupled to the Internet through another IP-based computer network.

29. The method according to claim 27, wherein the token requests an object stored in a database connected to the server computer, the method further comprising the steps of:

accessing the database for the object in response to the token; and sending the object to the client computer over the Internet.

30. The method according to claim 27, wherein the token contains at least one of user registration information, identification information, or other information, and the method further comprises the step of modifying a state of the server based on the information contained in the token.

31. The method according to claim 30, wherein the token further contains a request for an object stored in the database, the method further comprising the steps of:

accessing the database for the object in response to the token; and sending the object to the client computer.

32. The method according to claim 31, further comprising the step of displaying a status of the object sent to the client computer.

33. The method according to claim 32, wherein the status is displayed graphically.

34. The method according to claim 26, wherein the client memory includes at least one of a storage device and a CD-ROM.

35. The method according to claim 26, further comprising the step of converting the URL-encoded format token into the token sent to the server computer, the token sent to the server computer being a hypertext transfer protocol (HTTP) request.

36. The method according to claim 26, further comprising the step of converting the URL-encoded format token into the token sent to the server computer, the token sent to a server computer being formatted in a protocol selected from the group consisting of File Transfer Protocol (FTP), Mail, Telnet, Gopher, Network News Transport Protocol (NNTP), Chat, and Forums.

37. A program storage device comprising:

a storage area; and information stored in the storage area, the information being readable by a machine, and tangibly embodying a program of instructions executable by the machine for performing method steps comprising:

storing application instructions in a memory, the application instructions including a client application in the OSI Application Layer, said application providing a generic ISP accessing method as a native token format;

storing a plurality of dynamic link libraries of code in said memory, each storing details for accessing a respective one of a plurality of ISPs on the Internet;

selecting an Internet service provider from the plurality of Internet service providers;

converting a native format token of the application into a URL-encoded object request token by taking details of a selected ISP from one of said plurality of ISP-specific dynamic link libraries, and passing said URL-encoded object request token to an output program in the OSI Transport Layer; data;

establishing a connection with an online database through the selected Internet service provider; and retrieving information from the online database.

38. The program storage device according to claim 37, wherein the memory includes at least one of a storage device and a CD-ROM.

39. The program storage device according to claim 38, wherein the online database is a node on the Internet.

40. The program storage device according to claim 37, wherein the method steps further comprise the step of converting the URL-encoded format token into a hypertext transfer protocol (HTTP) request.

41. The program storage device according to claim 37, wherein the method further comprises the step of converting the URL-encoded format token into a token formatted in a protocol selected from a group consisting of File Transfer Protocol (FTP), Mail, Telnet, Gopher, Network News Transport Protocol (NNTP), Chat, and Forums.

42. The program storage device according to claim 37, wherein the method further comprises the step of displaying a status of the in format ion retrieved from the online database.

43. The program storage device according to claim 42, wherein the step of the method of displaying the status displays the status graphically.

* * * * *